United States Patent [19]
Lee et al.

[11] Patent Number: 6,078,930
[45] Date of Patent: Jun. 20, 2000

[54] MULTI-NODE FAULT-TOLERANT TIMESTAMP GENERATION

[75] Inventors: J. William Lee, Foster City; William H. Bridge, Jr., Alameda, both of Calif.

[73] Assignee: Oracle Corporation, Redwood Shores, Calif.

[21] Appl. No.: 08/961,798

[22] Filed: Oct. 31, 1997

Related U.S. Application Data

[63] Continuation of application No. 08/808,582, Feb. 28, 1997.

[51] Int. Cl.$^7$ .............................. G06F 17/00; G06F 11/00
[52] U.S. Cl. .............................. 707/202; 707/203; 714/20
[58] Field of Search ...................................... 707/200, 201, 707/202, 203; 714/12, 15, 16, 20

[56] References Cited

U.S. PATENT DOCUMENTS

| | | | |
|---|---|---|---|
| 4,507,751 | 3/1985 | Gawlick et al. | 364/900 |
| 5,001,730 | 3/1991 | Franaszek et al. | 375/107 |
| 5,155,678 | 10/1992 | Fukumoto et al. | 395/425 |
| 5,278,982 | 1/1994 | Daniels et al. | 395/600 |
| 5,280,611 | 1/1994 | Mohan et al. | 395/600 |
| 5,561,795 | 10/1996 | Sarkar | 395/600 |
| 5,566,180 | 10/1996 | Eidson et al. | 370/94.2 |
| 5,613,113 | 3/1997 | Goldring | 395/618 |
| 5,737,600 | 4/1998 | Geiner et al. | 395/616 |
| 5,778,387 | 7/1998 | Wilkerson et al. | 707/202 |
| 5,784,421 | 7/1998 | Dolev et al. | 375/354 |
| 5,822,381 | 10/1998 | Parry et al. | 325/356 |

OTHER PUBLICATIONS

Lamport, Leslie, "Time, Clocks, and the Ordering of Events in a Distributed System," Operating Systems, Communications of the ACM, Jul. 1978, vol. 21, No. 7, pp. 558–565, ACM 0001–0782/78/0700–0558.

Li, Chung–Sheng and Ofek, Yoram, "Distributed Souce–Destination Synchronization Using Inband Clock Distribution," IEEE Journal on Selected Areas in Communications, vol. 14, No. 1, Jan. 1996.

Sens, Pierre, "The Performance of Independent Checkpointing in Distributed Systems," Proceedings of the 28$^{th}$ Annual Hawaii International Conference on System Sciences— 1995.

(List continued on next page.)

*Primary Examiner*—Paul V. Kulik
*Attorney, Agent, or Firm*—McDermott, Will & Emery

[57] ABSTRACT

Techniques for determining a safe recovery time value after a failure of a first node in a computer system are described. According to the techniques, every node in a multi-node parallel database system maintains a logical clock for generating timestamps. The logical clocks are synchronized by attaching a current timestamp to every message that is sent by a node. When a node receives an incoming timestamp that is greater than the value indicated by the associated logical clock, it sets the associated logical clock forward to at least the value of the timestamp. When a node fails, a recovery node calculates a "safe" logical clock value to use in recovering the crashed node. In calculating the "safe" logical clock value, the recovery node searches specific areas of the database to locate and recover a most recent timestamp value associated with the crashed node. The recovery node then compares its current logical clock time value with the most recent crash node timestamp value to determine which timestamp is most recent. If the most recent crash node timestamp value is more recent than the recovery node's current logical clock time value, the recovery node's logical clock is updated to be at least as recent as the most recent crash node timestamp value. The recovery node then recovers the crashed node as its logical clock is guaranteed to be at least as recent as any timestamp value that was previously written to the database by the crashed node prior to failure.

54 Claims, 8 Drawing Sheets

OTHER PUBLICATIONS

Abali, Bulent and Stunkel, Craig B., "Time Synchronization on SP1 and SP2 Parallel Systems," IBM Thomas J. Watson Research Center, N.Y., 1995.

Vervoort, W.A., teWest, R., Schoute, A.L. and Hofstede, J., "Distributed Time–Management in Transputer Networks," Department of Computer Science, University of Twente, The Netherlands, 1991.

Comer, Douglas E. and Yavatkar, Raji, "High–Speed Propagation of Link Status Routing Control Information," Department of Computer Science at Purdue University and the Univeristy of Kentucky, 1990.

MULTI-NODE FAULT-TOLERANT TIMESTAMP GENERATION

This application is a continuation of and claims priority from patent application Ser. No. 08/808,582, filed Feb. 28, 1997, entitled Fault-Tolerant Timestamp Generation for Multi-Node Parallel Databases which is incorporated herein by reference.

FIELD OF THE INVENTION

The present invention relates to computer systems, and more specifically to mechanisms for assigning a sequence to events that occur within multi-node parallel database systems.

BACKGROUND OF THE INVENTION

A parallel database is a database that runs on more than one CPU (central processing unit). There are two kinds of parallel database systems. One kind of parallel database system is a single-node parallel database, which runs on a single symmetric multiprocessor (SMP). On an SMP, all CPUs share memory and disk. Another kind of parallel database system is a multi-node parallel database. Multi-node parallel databases run on a multiple number of nodes that do not share memory. Each node in the multi-node parallel database system can be an SMP or a single CPU. Unlike distributed databases, both single-node and multi-node parallel databases provide a single database image.

Single-node parallel databases typically scale to the number of CPUs supported by a single SMP machine. Today, these kinds of databases are widely used and supported by many vendors. SMPs generally can support up to a few dozen CPUs because of the limited capacity on a single SMP bus.

Multi-node parallel databases are more fault-tolerant. If one node dies, surviving nodes can keep the database available. Multi-node parallel databases are more scalable because the number of CPUs are not subject the limitation of a single SMP bus. Achieving better scalability in multi-node parallel database systems is a challenge, however, because sending messages between nodes is more expensive than referencing shared memory on an SMP machine.

One difficulty associated with sending messages between nodes is in the generation of timestamps for ordering events within the multi-node parallel database. A multi-node parallel database uses timestamps to track the sequence of changes made by different nodes to shared resources. For example, if two transactions change a common dictionary, the transaction with the more recent timestamp is the change that occurred after the change of a transaction with a less recent timestamp. During normal processing, the ordering of events is used to maintain consistency. During recovery time, the ordering is used to order redo records in a recovery log.

The problem of tracking the sequence of completed transactions is generally solved by marking every completed transaction with a consistently increasing serial number at the time the transaction completes. Later transactions will have serial numbers greater than earlier transactions, allowing transactions to be well-ordered. These serial numbers are often called timestamps, because they indicate when an event occurred within a computer system relative to other events.

Using a hardware clock for each node to generate these timestamps for each node, however, is problematic because physical devices are imperfect. Each local clock may be set to a different time, and some clocks may run faster than others. It is quite possible for the clock of one node to be running fast, and, as a result, its timestamps would have a greater value than those of another clock, even though the timestamps of the other clock were generated at the same physical time.

One way to avoid the problem of synchronizing the local clocks is to use a single global, hardware clock connected to every node in the multi-node parallel database system. However, in a database with many nodes, a single hardware clock requires custom-built hardware, adds cost, and limits the scalability of the entire system. Furthermore, many hardware systems today do not have such a global clock.

Another approach is to recognize that all the nodes in a multi-node parallel database system already communicate with one another by sending messages over the network. Thus, one node, called a global clock service, can be assigned the task of running a clock. When other nodes need a timestamp, the other nodes send a message to the global clock service, requesting a timestamp. Upon receipt of such messages, the global clock service would generate a timestamp, either by reading its hardware clock or, more easily, by incrementing a software-based serial number counter, and send the timestamp to the requester.

This approach works and is in common use, but it does have a substantial drawback. As the system gets larger, more nodes must communicate with the global clock server. As a result, more time is spent waiting for the global clock server to handle all the requests. Certain improvements to the global clock server approach can be made. However, the basic design is ultimately limited by the single global point of timestamp generation, which can become a performance bottleneck for the entire system.

A method to improve the performance of timestamp generation by avoiding the single point has been discussed in a classic article by L. Lamport, "Time, Clocks & the Ordering of Events in a Distributed System", 21 COMMUNICATIONS OF THE A.C.M. 558 (July 1978), incorporated herein by reference. In general, Lamport discloses a way to generate timestamps using a local clock, such as a local software-based counter, yet remain synchronized. According to Lamport's technique, every message sent between nodes bears a timestamp that indicates the current time of a local clock. When a node receives a "piggybacked" timestamp from another node which is running fast, the node receiving the timestamp would resynchronize its local clock forward to the faster time. This procedure ensures a partial ordering upon the distributed system. That is, all causes will have a lower timestamp than their effects. This is true because each transaction carries with it the most recent timestamp it has seen so far. By the time the timestamp is generated for the completed transaction, the timestamp will have a greater value than any of the prior transactions in the chain of messages.

In a distributed system that uses Lamport's method of synchronizing clocks associated with each node of a distributed system, each node must piggyback a timestamp in every message it sends to another node. With reference to FIG. 2, when a node is about to send a message to another node, the former node reads a timestamp from the associated clock (step 210) and piggybacks the timestamp to the message (step 220). At this point, the message may be sent to the other node (step 230).

When a message, containing a piggyback timestamp $TS_2$, is received by a node (step 310), the node performs the steps shown in FIG. 3. First, the node inspects the clock associated with the node to determine a local time $TS_1$ (step 320). Then, the node compares $TS_1$ and $TS_2$ (step 330). If $TS_2$ indicates a more recent time than $TS_1$ (step 340), then execution proceeds to step 350, otherwise the process terminates. In step 350, the node sets the time of its clock to be at least that of the timestamp. A simple way is to set the clock to a time equal to the timestamp.

This Lamport approach does not, however, indicate which causally unconnected events happen before the other. For example, if event A on node A did not cause event B on node B, and event B on node B did not cause event A on node A, then the timestamps assigned to events A and B by nodes A and B, respectively, will not necessarily reflect the actual sequence of events A and B.

To reflect the sequence of causally unrelated events, a total ordering is necessary. Any one set of total orderings can easily be derived from a partial ordering through simple arbitrary rules, such as granting certain nodes automatic priority for causally unconnected events. Although any derivable total ordering is sufficient to maintain the consistency of the concurrent database, users may have their own ideas about which casually unconnected event occurs before another. When they disagree, anomalous behavior results. This is a problem for multi-version databases.

A multi-version database is a database that manages concurrency control via versions and snapshots. A multi-version database stamps each version of data with a logical timestamp. When a process initiates a transaction to read an item of data from a multi-version database, the process generally does not obtain a lock to prevent other processes from concurrently modifying the data. Instead, the process reads a snapshot of the data at a particular point in time, determined by a timestamp generated at the beginning of the transaction. Consequently, the process might read information that is slightly older than the most current version, but the information is guaranteed to be consistent.

For example, consider a distributed database using Lamport's technique that implements a checking account. Suppose a husband makes a deposit in the checking account at his node and telephones his wife that the money is there. She then queries the checking account at her node to see how much money is there. As far as the database is concerned, these events are causally unconnected and it has no way of knowing that the snapshot time for the wife's transaction should be more recent than the timestamp for the husband's transaction. Technically, the husband's phone call to his wife violated a specification of Lamport's approach, because his telephone call to his wife did not piggyback a timestamp to the wife's node. If the snapshot time of the wife's balance inquiry is less recent than the timestamp of the husband's deposit, she would then not see the money deposited into the account, even though her husband had deposited it earlier in real time and told her about it. It is clearly desirable to reduce the amount of this kind of anomalous behavior in a database system.

Lamport recognized this problem and proposed to address it by mandating that every node keep a sufficiently accurate physical clock. This scheme is difficult to implement for database systems, because physical clocks are not reliable. Physical clocks run at different rates, they may be changed by an external user, and they require periodic resynchronization.

Another drawback with Lamport's method is that it is not fault-tolerant. In a multi-node parallel database, different nodes may share data stored on a non-volatile memory, such as a disk. Thus the disk becomes another medium in which anomalous behavior may occur. Typically, multiple nodes synchronize their write operations to disk with distributed locks. A node writing to a block of data to disk obtains an exclusive lock for the disk block, while a node reading a disk block obtains shared lock. Thus one can respect the causalities propagated via the disk by piggybacking timestamps in the lock messages according to the Lamport technique. However, this scheme only works if all nodes are alive. When a node dies, it may have advanced its local time way ahead of others and wrote that timestamp to disk. But this high local timestamp cannot be piggybacked to other nodes to propagate the causality. Consequently, when other surviving nodes read the data on disk (e.g., as part of recovery), it may unexpectedly encounter data in the future of its local time, violating causality that the Lamport technique guarantees.

SUMMARY OF THE INVENTION

A method and apparatus are provided for determining a safe recovery time value after a failure of a first node in a computer system. The first node is one of a plurality of nodes having access to a database. Each of the nodes maintains a logical clock. When any of the nodes make changes to the database, the nodes store within the database a time value, read from their logical clock, to indicate the relative time at which the changes were performed.

After failure of the first node, a recovery node determines a recovery timestamp value that is at least as recent as any time value recorded in the database by the first node prior to failure. According to one aspect of the invention, the recovery node determines the latest time value stored by the first node for logged changes by reading the time value stored in the most recent log entry for the crashed node. For unlogged changes, the recovery node inspects time values stored in certain unlogged bodies of data. In addition, nodes are prevented from storing in the database unlogged data that is associated with a timestamp that is more than a "crash delta" greater than the latest timestamp stored in the log of the node. Consequently, a recovery node can be sure that no unlogged changes made by a crashed node was associated with a timestamp greater than the latest log timestamp plus the crash delta.

After determining a recovery timestamp value, the recovery node applies to the database one or more updates that were recorded in a log file associated with the first node. Recovery node then assigns to the one or more updates timestamp values that reflect a time that is at least as recent as the recovery timestamp value.

BRIEF DESCRIPTION OF THE DRAWINGS

The present invention is illustrated by way of example, and not by way of limitation, in the figures of the accompanying drawings and in which like reference numerals refer to similar elements and in which.

DETAILED EMBODIMENT DESCRIPTIONS

A method and apparatus for assigning a sequence to events within a multi-node parallel database system is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

HARDWARE OVERVIEW

Figure 1:
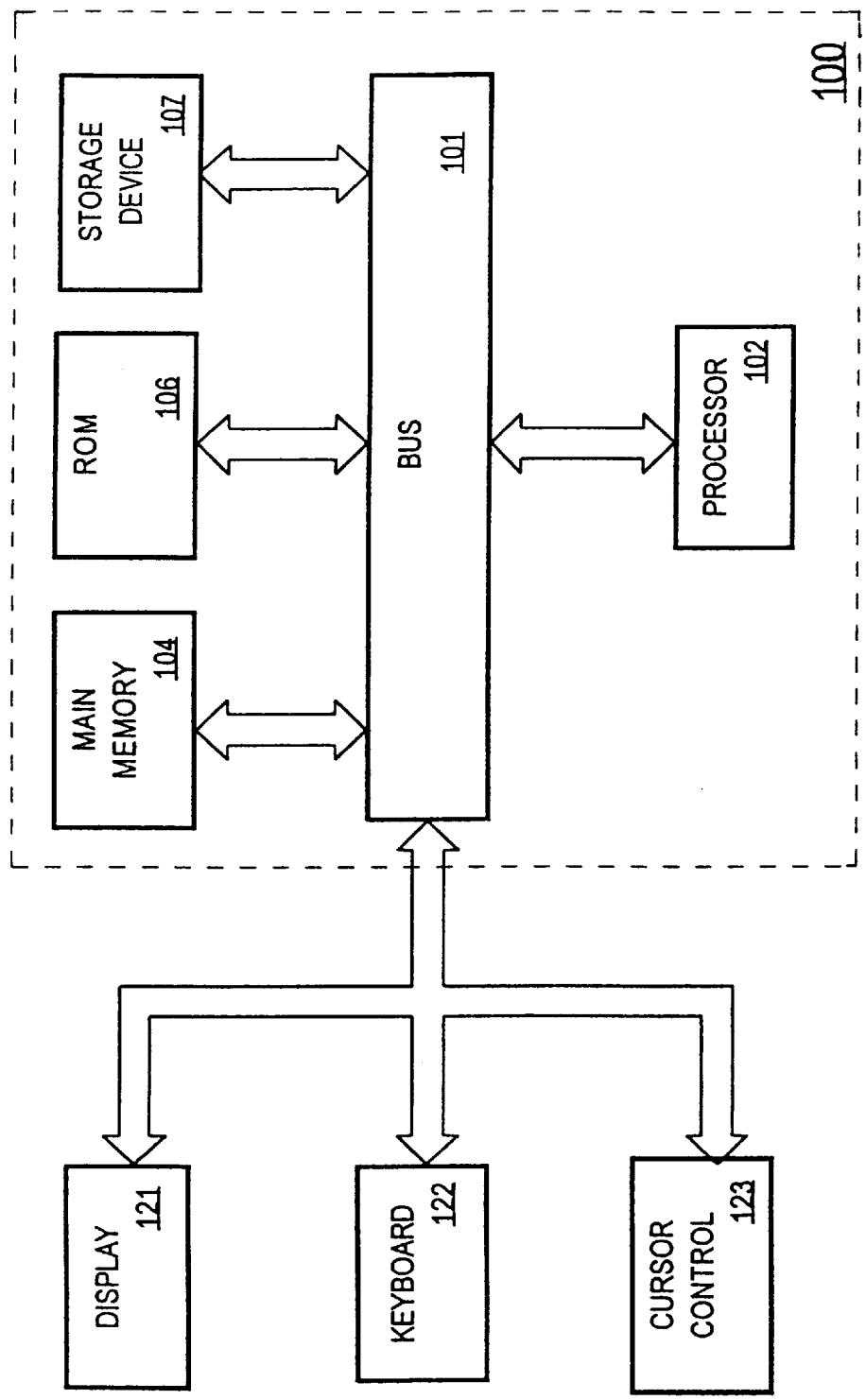
FIG. 1 is a high-level block diagram of a computer system.
Figure 2:
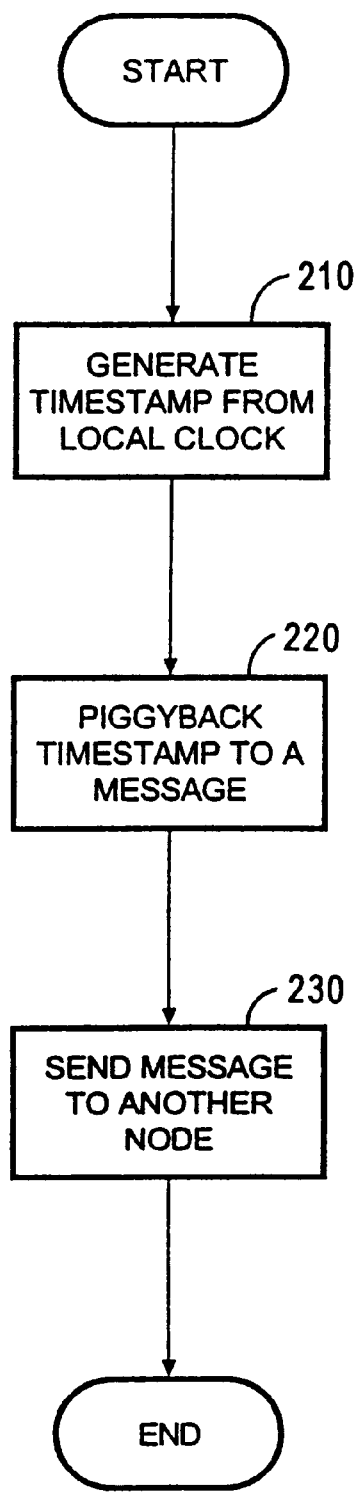
FIG. 2 is a flow chart depicting the clock synchronization steps a node performs in sending a message.
Figure 3:
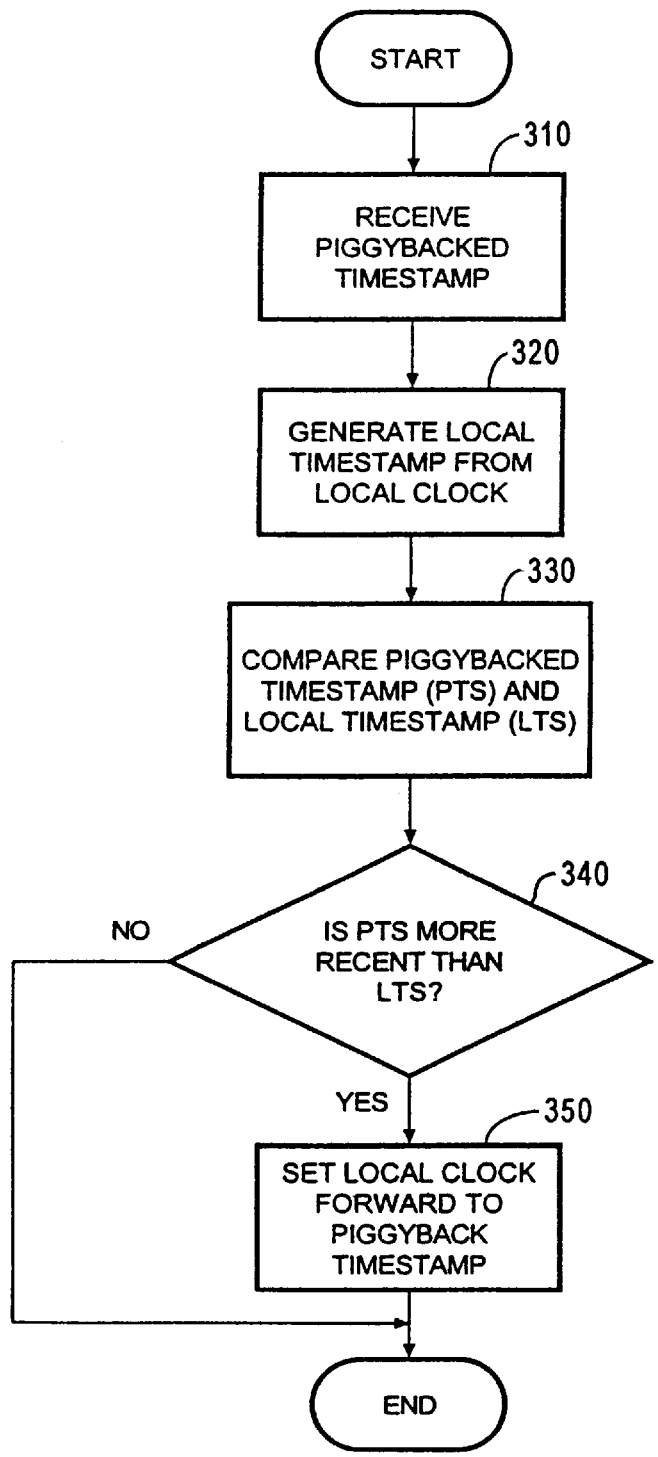
FIG. 3 is a flow chart depicting the clock synchronization steps a node performs in receiving a message.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse.

The present invention is related to the use of computer system 100 to assign a sequence of events in a multi-node parallel database. According to certain embodiments, assigning a sequences of events in a multi-node parallel database is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

MAINTAINING LOGICAL CLOCKS

According to an embodiment of the invention, each node in a multi-node parallel database computer system maintains a logical clock independent from its physical clock. The nodes are then configured to send messages that piggyback timestamps from their logical clocks in a way that ensures that a message with a timestamp from the most recent logical clock reaches every other node within a prescribed period.

Upon receiving the message that contains the timestamp of the most recent logical clock, each node synchronizes its own logical clock to the timestamp. For example, a node may perform the synchronization by determining whether the timestamp contained in the message represents a time more recent than the time represented on the logical clock. If the time represented in the timestamp in the message represents a time that is more recent than the time represented on the logical clock, then the node sets the logical clock to a value that represents a time at least as recent as the time represented in the timestamp contained in the message.

Because the timestamp of the most recent logical clock reaches every node within the prescribed period, anomalous behavior cannot occur outside the prescribed period of time because each node will synchronize to the fastest counting logical clock in the multi-node parallel database system within the period. Therefore, causally unconnected events occurring outside the prescribed period of time will be ordered according to the actual sequence of events.

In the example of the checking account, the husband makes a deposit in the checking account at his node and telephones his wife that the money is there. After the telephone conversions, she immediately queries the checking account at her node to see how much money is there. Although these events are causally unconnected as far as the multi-node parallel database is concerned, the telephone conversation will take some amount of time. If that amount of time is greater than the prescribed period of time, then the node that runs the wife's query, during that period, will be synchronized to the fastest counting logical clock in the multi-node parallel database system. Even if the husband's node at the time of deposit had the fastest running clock, the logical clock at the wife's node after the telephone call will represent a more recent time. As long as the prescribed period of time is set to a sufficiently small period of time, most causally unconnected events will be properly ordered.

REDUCING ANOMALOUS BEHAVIOR

Certain embodiments of the invention guarantee that a message with the most recent logical timestamp reaches every node within the prescribed period by requiring every node to communicate in a round-robin fashion with every other node in the system. Since one of those nodes has the fastest running logical clock, every other node will receive a timestamp from the fastest running logical clock and synchronize to it. However, such a requirement exhibits an expensive, quadratic growth pattern in the number of required messages in the multi-node parallel database system.

Consequently, in another embodiment of the invention, the number of messages that must be transmitted within the system is reduced to a linear growth pattern by designating one node as a central node in the multi-node parallel database system. Within each prescribed period, the central node sends a message to every other node in the multi-node parallel database system, and each of the other nodes send a message to that central node. Thus, a message from the node with the most recent time will force the central node to the most recent time, and messages sent from the central node after the central node has received that message will subsequently force all the other nodes to the most recent time.

Figure 4:
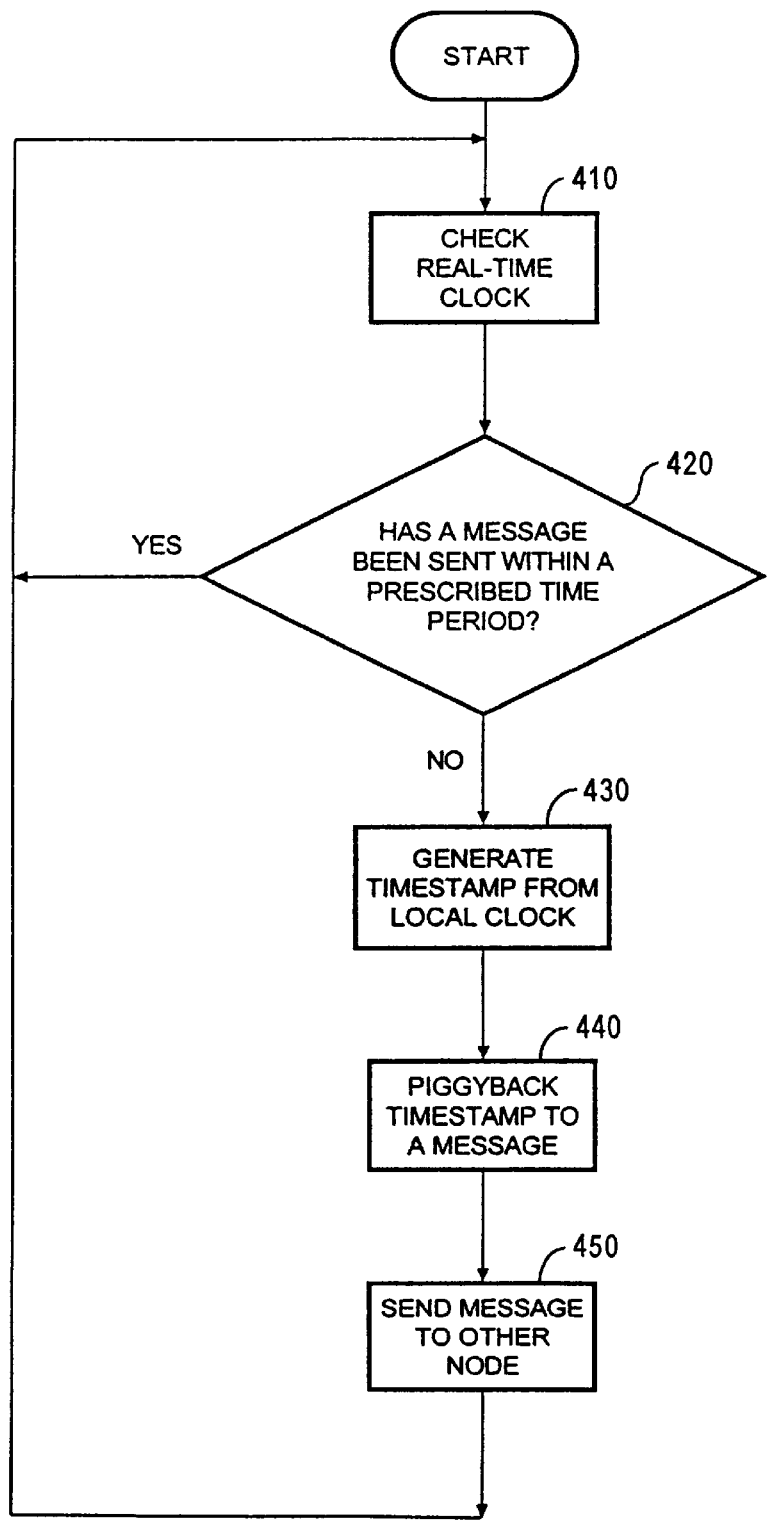
FIG. 4 is a flow chart depicting the periodic steps of the first embodiment of the present invention.

The operation of a node in an multi-node parallel database computer system that employs an embodiment of the invention is shown in the flowchart of FIG. 4. Referring to FIG. 4, the node checks a real-time clock, a standard component of a computer system, to see if it has sent a message to the central node in the prescribed period of time (step 410). This checking may be achieved by polling the clock or waiting for a timer interrupt from the system clock.

If the prescribed period is about to elapse and the node has not sent a message to the central node within the prescribed period of time (step 420), then the node executes step 430, reading a timestamp from the logical clock associated with the node; step 440, piggybacking the timestamp to a message; and step 450, sending the message to the central node. After the message has been sent, execution of the process returns to step 410.

Determining the actual length of the prescribed period must be done on a case-by-case basis, because it involves making a trade-off between the acceptable efficiency of the multi-node parallel database system and the amount of tolerable anomalous behavior. Minimizing the length of the prescribed period reduces the amount of anomalous behavior, but impairs the system efficiency. On the other hand, increasing the length of the prescribed period improves the system efficiency but allows more anomalous behavior. As a result, the prescribed period is determined on an individual basis by a tunable parameter for the multi-node parallel database system.

By using the standard real-time clock distinct from the logical clock, this invention obtains two advantages over Lamport's approach in reducing anomalous behavior. First, the logical clock is continually resynchronized instead of the standard clock, allowing the standard clock to be used for its intended purposes. Second, implementing the logical clock as a software counter is now feasible, because the standard clock, not the logical clock, is used to determine the prescribed period with sufficient accuracy.

FAULT-TOLERANT TIMESTAMP GENERATION

Figure 5:
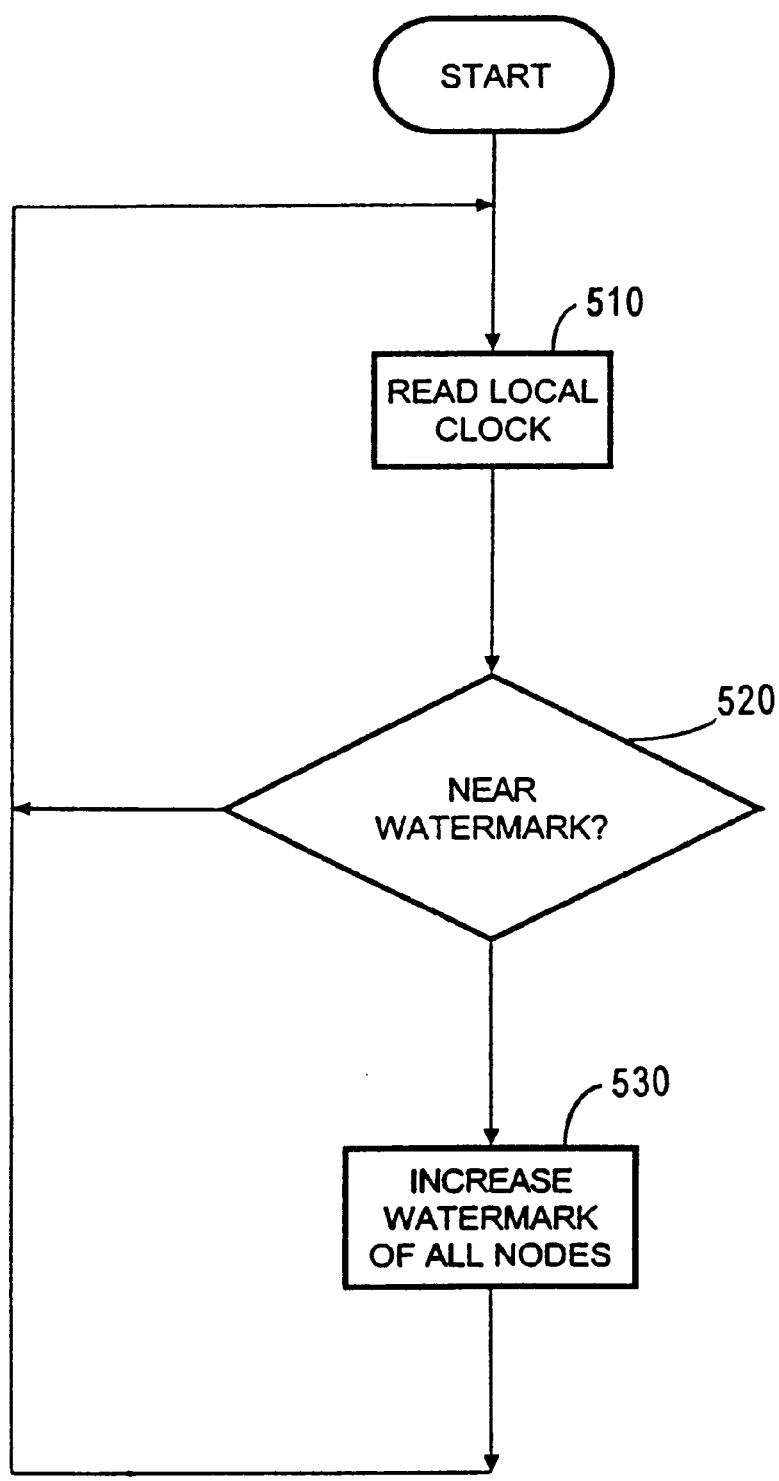
FIG. 5 is a flow chart depicting the periodic steps of the second embodiment of the present invention.

Another aspect of the invention facilitates the recovery of a crashed node in a fault-tolerant multi-node parallel database system. Every node maintains a watermark which indicates a time value later than any logical clock in the system to ensure that a node recovering the actions of the crashed node has a logical clock representing a later time than that of the crashed node. With reference to the flowchart of FIG. 5, a node in step 510 reads a timestamp from an associated logical clock. Then, the node checks the timestamp against a watermark associated with and maintained by the node (step 520). If the timestamp is sufficiently near the watermark, determined with respect to a threshold value, then the node in step 530 forces itself and all other nodes of the multi-node parallel database system to raise their watermarks by a prescribed increment. Finally, the process returns back to step 510. If the threshold value is small enough so that other nodes are likely to cross the watermark, then the method of forcing all other nodes to increase the watermark further includes the steps of stopping all other logical clocks, then increasing the watermark, then resuming the logical clocks.

Figure 6:
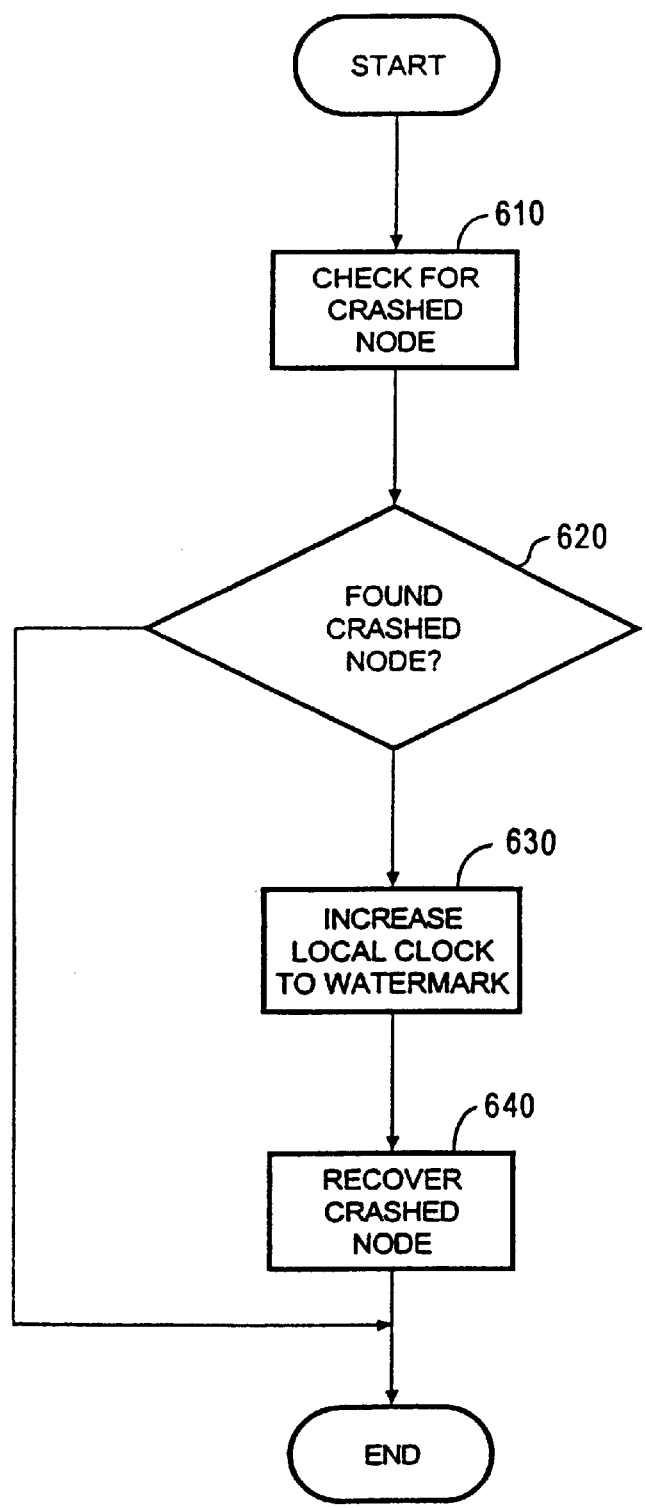
FIG. 6 is a flow chart depicting the recovery steps of the second embodiment.

In this manner, the maintained watermark indicates a timestamp value that is greater than or equal to any timestamp presently generated in the multi-node parallel database system. This invariant facilitates instant recovery of a crashed node as described in the flowchart of FIG. 6. In step 610, a node in a fault-tolerant multi-node parallel database system checks for a crashed node. If a crashed node is found (step 620), then a recovery node is directed to execute the following steps. First, the recovery node sets the associated logical clock to be at least as recent as the time reflected in the watermark (step 630). Then, the recovery node performs the normal recovery operation upon the crashed node (step 640).

As a result, the recovery node has a logical clock that is guaranteed to be later than the logical clock of the crashed node. According to certain embodiments of the invention, the recovery node determines a guaranteed later time in a constant time operation of reading the watermark, instead of the linear time operation of scanning the entire recovery log of the crashed node. Moreover, maintaining a watermark in this manner works even if certain changes to the database are not logged in the recovery log.

DETERMINING A SAFE RECOVERY TIME VALUE WITHOUT A HIGH WATERMARK

A drawback associated with the technique described above to maintain and use a high watermark to indicate a time value later than any logical clock of a multi-node system is that it requires each node to continually maintain and update a local high watermark value. Every node must continuously compare its logical timestamp value with the high watermark to determine if its time value is within a certain threshold. In addition, whenever a node crosses the high watermark threshold, all other nodes must be notified to increase their own local high watermark value. The overhead associated with repetitively performing these maintenance steps can significantly reduce the throughput of a multi-node parallel database system.

Therefore, in certain embodiments of the invention, the node that has the responsibility of recovering the events of a crashed node determines a safe logical clock value to use without relying on a high watermark. For the purposes of recovery, a "safe" logical clock value is a clock value that is at least as great as the larger of (1) the current logical clock value of the recovery node and (2) the highest timestamp associated with data that the failed node persistently stored to disk before failure. The current logical clock value of the recovery node is readily available to the recovery node. However, the highest timestamp associated with data stored by the failed node is not.

According to an embodiment of the invention, the recovery node searches specific areas of the database to locate and recover a most recent timestamp value associated with the crashed node. The recovery node then compares its current logical clock time value with the most recent crash node timestamp value to determine which timestamp is most recent. If the most recent crash node timestamp value is more recent than the recovery node's current logical clock time value, the recovery node's logical clock is updated to be at least as recent as the most recent crash node timestamp value.

After the recovery node determines the most recent timestamp value and updates its logical clock appropriately, the crashed node is rolled back to a valid state. In rolling back the crashed node, the recovery node uses the current time value of its logical clock to ensure that the crash recovery events have an associated time stamped value more recent than any crashed node timestamp value previously stored on the database. This process is necessary to guarantee that a logical timestamp ordering is maintained throughout the database after a crashed node is recovered.

DETERMINING THE LATEST TIMESTAMP FOR THE CRASHED NODE

As stated above, retrieving the most recent timestamp value associated with changes stored to disk by the crashed node requires the recovery node to search specific areas of the database for the most recent logical timestamp of the crashed node.

The changes made to disk by the crashed node before it crashed fall into two separate categories: logged changes and unlogged changes. Logged changes are changes for which redo information was stored to disk. Unlogged changes are changes that were made without generating redo information.

DETERMIMNG THE LATEST TIMESTAMP FOR LOGGED CHANGES

A redo log is a file maintained in the database that stores a low-level representation of database changes made by a particular node. A unique redo log is associated with each node and can be used to reconstruct database changes that were previously made to the database by a particular node. The low-level changes within the redo log correspond to specific events that were previously executed or processed by the affiliated node. Each entry in the redo log is associated with a logical timestamp that indicates a time ordering of when a particular event completed. The events are ordered within the redo log in a sequential order with the most recent timed event being the last event entered.

Thus, in certain embodiments, to calculate the most recent timestamp of crashed node 702, recovery node 704 retrieves the most recent timestamp from crashed node redo log 710. Because the events are ordered sequentially with the most recent event entered last, recovery node 704 can quickly retrieve the most recent timestamp value stored in the redo log.

The timestamp found in a particular node's redo log almost always corresponds to the node's most recent timestamp value within the database. Therefore, it is highly likely that the timestamp retrieved from crashed node redo log 710 will represent its most recent timestamp value within the database. However, certain database systems allow nodes to make changes that are not logged, or that are not logged at the time that the changes are made. When such unlogged changes are allowed, techniques must be provided for determining the timestamps associated with the unlogged changes.

DETERMINING THE LATEST TIMESTAMP FOR UNLOGGED CHANGES

According to certain embodiments of the invention, two techniques are employed for determining the timestamp associated with unlogged changes. The first technique involves causing nodes to store their identity and a timestamp value when they perform an unlogged update. This technique may be used, for example, for certain bodies of data for which logs are never generated. Before storing a timestamp value associated with the unlogged changes, each node first compares its current timestamp with the most recent timestamp value contained within the unlogged body of data. If the timestamp value contained within the unlogged body of data is more recent than the node's timestamp value, the node updates its timestamp to be at least as recent as the most recent timestamp value contained within the unlogged body of data.

After a crash, each of the bodies of data may be individually inspected to determine whether they were changed by the crashed node, and if so, retrieve the timestamp value associated with the change. This technique works well if the database contains relatively few bodies of data for which logs are never generated. However, if high numbers of data items are unlogged, or are allowed to contain unlogged data, then this approach becomes to costly.

The second technique involves preventing unlogged changes from being made when the timestamps for the unlogged changes are more than a predetermined value (a "crash delta") greater than the highest timestamp stored in the associated log file. For example, assume that all nodes are prevented from making unlogged changes for events whose timestamps would be more than 30 greater than the highest timestamp stored in the log file. If all nodes operate under that rule, then when a node crashes, a recovery node can easily determine a safe logical clock value before performing recovery. Specifically, if the highest entry in the redo log has a timestamp of 300, then the recovery node can be assured that the crashed node did not store any unlogged changes associated with a timestamp greater than 330. The recovery node can then safely set its logical clock to the greater of its current logical clock value and 330.

EXEMPLARY SYSTEM

Figure 7:
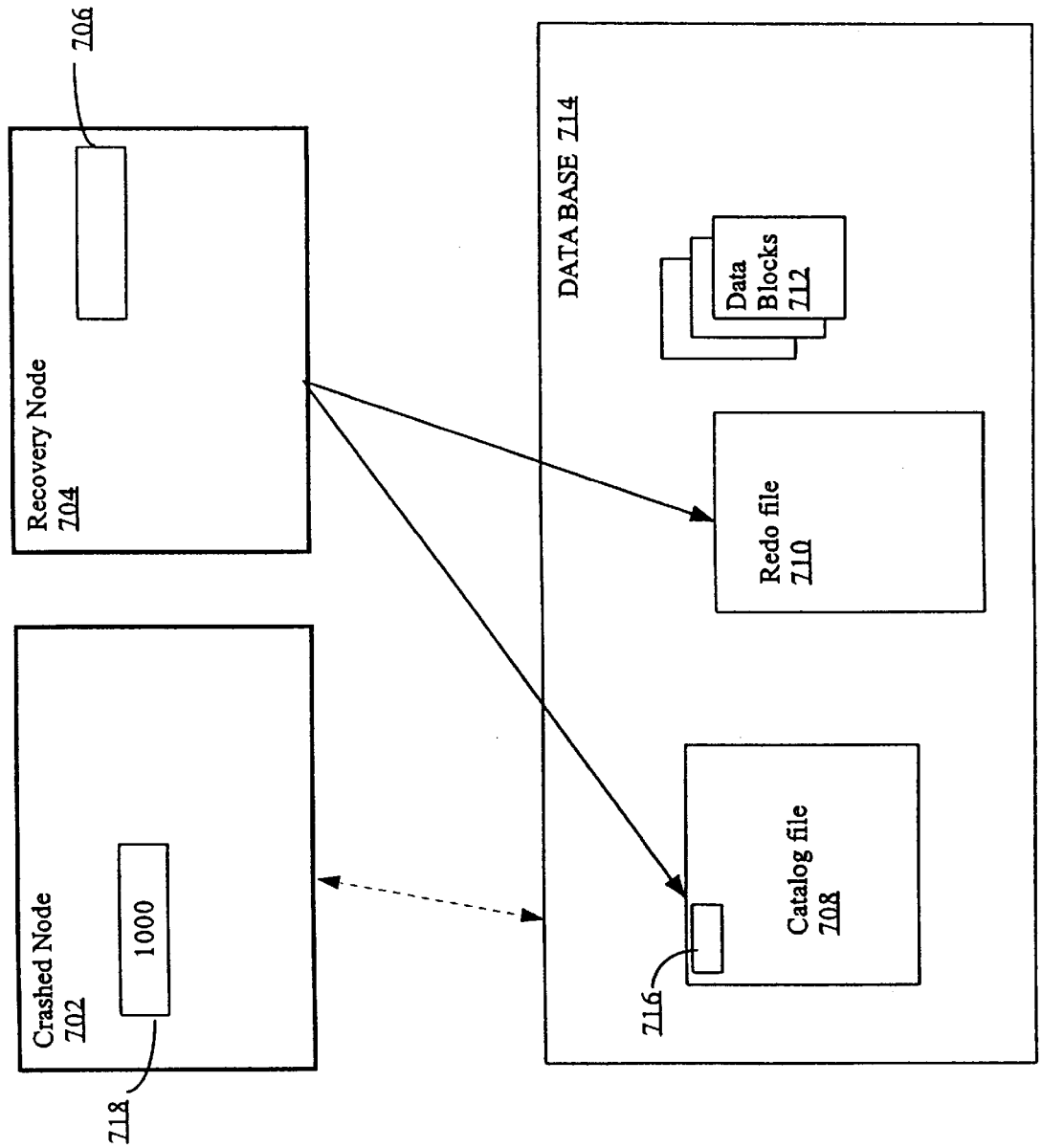
FIG. 7 is a block diagram of a database system in which a recovery node searches specific areas of a database in order to calculate a "safe" logical clock value prior to recovery of a crashed node.

FIG. 7 illustrates an exemplary system that uses both techniques described above to determine the latest timestamp associated with unlogged data of a crashed node. In the exemplary system, recovery node 704 is responsible for recovering crashed node 702. Three areas of database 714 may contain event timestamps associated with crashed node 702. These areas include a control or catalog file 708, crashed node redo log 710, and data blocks 712.

Of these three areas, the redo log 710 contains timestamps for logged changes made by the crashed node 702, and both the catalog file 708 and the data blocks 712 may contain timestamps associated with unlogged changes. The catalog file 708 is a body of data for which no redo log is generated. Redo is typically generated for changes to data blocks 712, but the database system may allow redo for some changes to the data blocks to be deferred. Consequently, when node 702 crashes, some of the data blocks 712 may reflect unlogged changes made by the crashed node 702.

Referring to catalog file 708, it contains data about the physical structure of the database and maintains such information as the database name, the names and locations of the database's data files and timestamps indicating the database creation date. According to certain embodiments, all nodes that access the catalog file 708 store their identity and current logical clock value within the catalog file 708. Prior to storing its current logical clock value within the catalog file 708, the node first compares its current logical clock value with the most recent timestamp value contained within the catalog file 708. If the timestamp value contained within the catalog file 708 is more recent than the node's current logical clock value, the node updates its current logical clock to be at least as recent as the most recent timestamp value contained within the catalog file 708.

Because the timestamp of the node that last accessed the catalog is located within the catalog file, the catalog file is searched to determine if the timestamp value is associated with the crashed node.

For example, in one embodiment, catalog file 708 stores timestamp information in catalog timestamp 716 which indicates the most recent node to access catalog file 708. In certain embodiments, catalog timestamp 716 is maintained in block one of catalog file 708. This allows recovery node 704 to quickly retrieve the timestamp value contained in catalog file 708. After retrieving the timestamp value contained in catalog file 708, recovery node 704 must determine if the timestamp value is associated with crashed node 702.

If the timestamp value retrieved from catalog file 708 is associated with crashed node 702, then recovery node 704 compares the timestamp value with its current logical clock time value. If the timestamp value retrieved from catalog file 708 is more recent than the logical clock value of recovery node 704, recovery node 704 sets its logical clock 706 to be at least as recent as the timestamp value retrieved from catalog file 708.

As mentioned above, in certain instances a node in the exemplary system may update the data blocks 712 within database 714 without generating an entry in its redo log. This situation occurs when a node completes an event and associates a logical timestamp with the event but fails to write the information in its redo log. Instead, the completed event and associated timestamp information is logged to a data block on disk for future processing and updating of the node's redo file. If a node crashes before its redo log is updated with previously completed event information contained within the data block, the crashed node's most recent timestamp may be stored in a data block somewhere on disk and not in crashed node's redo log.

Thus, in certain embodiments, each node maintains a crash delta such that unlogged changes associated with a logical timestamp above a specified value (crash delta threshold) are not written to a data block. For example, if crash delta 718 is set at 1000 and the most recent timestamp value contained within crashed node redo log 710 is 5000, the crash delta threshold is 6000 and unlogged changes associated with timestamp values above 6000 will not be allowed to be written to data blocks 712. Instead, the changes will either have to be logged to the crash node redo log 710 or postponed until a record is stored in the crashed node redo log 710 that has a timestamp which, when added to the crash delta, is greater than the timestamp associated with the postponed unlogged changes.

Therefore, by adding crash delta 718 to the most recent timestamp value contained in crashed node redo log 710, recovery node 704 generates a summed timestamp value that is guaranteed to be greater than (i.e. reflect a time more recent than) any timestamp value contained in data files 712.

After calculating the summed timestamp value, recovery node 704 compares its current logical clock time value with the summed timestamp value. If the summed timestamp value is more recent than the logical clock time value of recovery node 704, recovery node 704 sets its logical clock 706 to be at least as recent as the summed timestamp value. Recovery node 704 can then proceed to recover crashed node 702 as the logical clock time value of recovery node 704 is guaranteed to be more recent than any crashed node timestamp value contained on database 714.

CALCULATING A SAFE LOGICAL CLOCK VALUE

Figure 8:
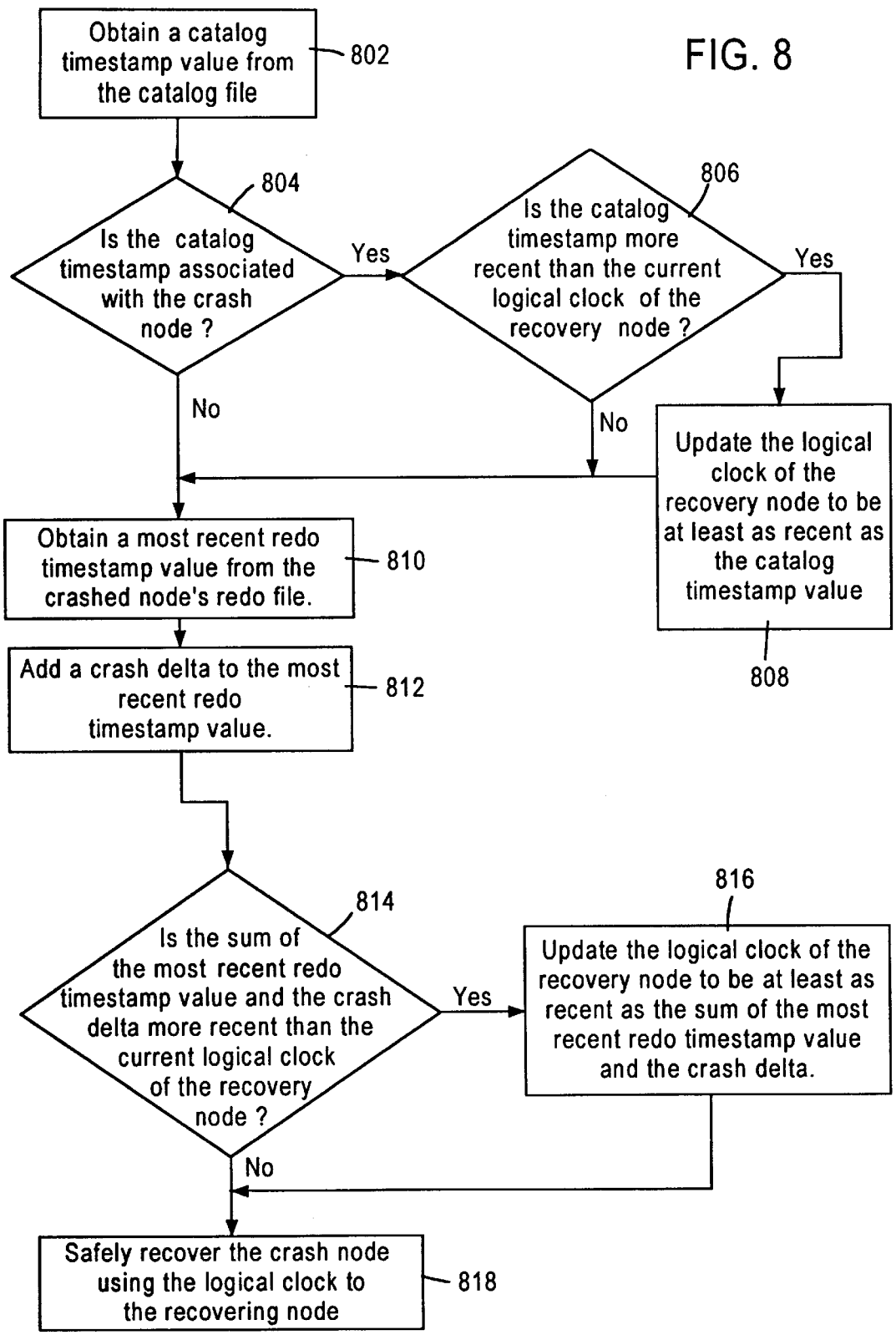
FIG. 8 is a flow diagram illustrating the manner in which specific areas of a database can be searched in order to calculate a "safe" logical clock value prior to recovery of a crashed node.

As stated above, a recovery node must first calculate a "safe" logical clock value before recovering a crashed node. This "safe" logical clock value must be guaranteed to be more recent than any timestamp value that was previously stored on the database by the crashed node prior to the node's failure. The calculated "safe" logical clock value is utilized in recovering the crashed node. FIG. 8 is a flow diagram illustrating the manner in which specific areas of a database can be searched in order to calculate a "safe" logical clock value that can be used to recover a crashed node.

At step 802, recovery node 704 obtains catalog timestamp 716 from catalog file 708. Catalog timestamp 716 contains a timestamp value associated with the most recent node that accessed catalog file 708. In certain embodiments, catalog timestamp 716 is located in block one of catalog file 708 so as to reduce the search time for recovery node 704.

At step 804, recovery node 704 determines if catalog timestamp 716 is associated with crashed node 702. If catalog timestamp 716 is not associated with crashed node 702, control proceeds to step 810. Otherwise, if catalog timestamp 716 is associated with crashed node 702, at step 806, recovery node 704 compares its current logical clock value to the time value of catalog timestamp 716. If the time value of catalog timestamp 716 is not more recent than the current logical clock value of recovery node 704, control proceeds to step 810. Otherwise, if the time value of catalog timestamp 716 is more recent than the current logical clock value of recovery node 704, at step 808 recovery node 704 updates its logical clock 706 to be at least as recent as the time value of catalog timestamp 716. Control then proceeds to step 810.

At step 810, recovery node 704 obtains a most recent redo timestamp value from redo file 710. After obtaining the most recent redo timestamp value from redo file 710, at step 812 recovery node 704 adds a crash delta 718 to the most recent redo timestamp value.

At 814, recovery node 704 compares its current logical clock value to the sum of the crash delta 718 and the most recent redo timestamp value. If the sum of the crash delta 718 and the most recent redo timestamp value is not more recent than the current logical clock value of recovery node 704, control proceeds to step 818. Otherwise, if the sum of the crash delta 718 and the most recent redo timestamp value is more recent than the current logical clock value of recovery node 704, at step 816, recovery node 704 updates its logical clock 706 to be at least as recent as the sum of the crash delta 718 and the most recent redo timestamp value. Control then proceeds to step 818.

At step 818, because recovery node 704 is guaranteed that its logical clock value is more recent than any timestamp value previously stored on the database 714 by crashed node 702, recovery node 704 uses its logical clock value to "safely" recover crashed node 702.

NODE RECOVERY

After recovery node 704 has set its logical clock to a safe recovery time, the recovery node 704 may then proceed to recover the database 714. Because redo file 710 may contain data blocks containing both committed change data and noncommitted change data, a two phase process is used to recover database 714.

In the first phase, recovery node 704 rolls forward or reapplies all of the changes recorded in redo file 710 to an image of database 714. After rolling forward, the database image contains all committed change data as well as any uncommitted change data that was previously recorded in redo file 710. During the second phase, recovery node 704 rolls back the database image by undoing all change data that was never previously committed (i.e. uncommitted change data). Database 714 is then updated to reflect the recovery data contained in the database image.

The changes made by the recovery node 704 while recovering from the crash of node 702 are associated with timestamps assigned from the logical clock of the recovery node 704. Because the recovery node 704 sets its logical clock 706 to a safe recovery time value prior to performing the recovery of crashed node 702, all actions taken by the recovery node 704 during recovery will be associated with timestamp values that are guaranteed to be more recent than any timestamp value previously stored in the database 714 by the crashed node 702 prior to the crash.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for determining a safe recovery time value after a failure of a first node in a computer system, wherein said first node is one of a plurality of nodes that has access to a database, wherein a plurality of logical clocks are associated with said plurality of nodes, the method comprising the steps of:

prior to said failure, said first node maintaining a first logical clock of said plurality of logical clocks to assign time values to changes made to said database by said first node;

after said failure, reading a most recent log timestamp value from a log file associated with said first node;

determining, based on said most recent log timestamp value, a recovery timestamp value that is at least as recent as any time value recorded in said database by said first node prior to said failure; and recovering said first node using said recovery timestamp value.

2. The method of claim 1 wherein the step of determining said recovery timestamp value includes the steps of:

reading a crash delta value, wherein said crash delta value equals a predetermined value;

calculating a second timestamp value, wherein said second timestamp value equals the sum of said most recent log timestamp value and said crash delta value; and determining said recovery timestamp value based on said second timestamp value.

3. The method of claim 1 further comprises performing the following steps prior to the failure of said first node:

detecting an attempt by the first node to perform an update to said database without storing data in said log file to reflect said update;

in response to said attempt, performing the steps of determining whether the logical clock of said first node is less than the sum of the most recent log timestamp value that is recorded in said log file and a crash delta value;

if the logical clock of said first node is not less than the sum of the most recent log timestamp value that is recorded in said log file and said crash delta value, then prohibiting said update to said database by said first node.

4. The method of claim 3 wherein the step of prohibiting said update to said database includes the steps of:

waiting until the sum of the most recent log timestamp value that is recorded in said log file and said crash delta value is greater than said logical clock of said first node; and after the sum of the most recent log timestamp value that is recorded in said log file and said crash delta value is greater than said logical clock of said first node, allowing the first node to perform said update to said database without storing data in said log file to reflect said update.

5. The method of claim 3 wherein the step of prohibiting said update to said database includes the steps of:

allowing said first node to perform said update to said database; and causing said first node to store data in said log file to reflect said update.

6. The method of claim 1 further comprising the steps of:

applying to said database one or more updates that are recorded in said log file associated with said first node; and assigning to said one or more updates timestamp values that reflect a time that is at least as recent as said recovery timestamp value.

7. The method of claim 1 wherein:

said database includes a body of data whose updates are not recorded in said log file; and the method further comprising the step of, prior to failure of said first node, causing each of said plurality of nodes to perform the following steps when updating said body of data:

reading a timestamp value from said body of data;

comparing said timestamp value with a logical clock value of said node that is updating said body of data;

if said timestamp value is more recent than said logical clock value of said node that is updating said body of data, then setting said logical clock of said node that is updating said body of data equal to said timestamp value; and writing said logical clock value of said node that is updating said body of data into said body of data.

8. The method of claim 1 wherein the step of determining said recovery timestamp value further includes the steps of:

reading a third timestamp value from a body of data, wherein updates to said body of data are not recorded in said log file; and determining said recovery timestamp value based on said third timestamp value.

9. The method of claim 8 wherein the step of reading said third timestamp value from said body of data further comprises the step of reading said third timestamp value from a catalog file, wherein said catalog file maintains data that reflects a physical structure of said database.

10. The method of claim 1 wherein the step of determining said recovery timestamp value includes the steps of:

reading a crash delta value, wherein said crash delta value equals a predetermined value;

calculating a second timestamp value, wherein said second timestamp value equals the sum of said most recent log timestamp value and said crash delta value;

reading a third timestamp value from a body of data, wherein updates to said body of data are not recorded in said log file;

comparing said second timestamp value with said third timestamp value; if said second timestamp value is more recent than said third timestamp value, then setting said recovery timestamp value equal to said second timestamp value; and if said third timestamp value is more recent than said second timestamp value, then setting said recovery timestamp value equal to said third timestamp value.

11. The method of claim 1 wherein the step of determining said recovery timestamp value further comprises the steps of:

reading a logical clock value from a second node, wherein said second node is one of said plurality of nodes and wherein said second node is responsible for recovering said first node;

comparing said recovery timestamp value with the logical clock value of said second node; and if the logical clock value of said second node is more recent than said recovery timestamp value, then setting said recovery timestamp value equal to the logical clock value of said second node.

12. A computer-readable medium having stored thereon sequences of instructions for determining a safe recovery time value after a failure of a first node in a computer system, wherein said first node is one of a plurality of nodes that has access to a database, wherein a plurality of logical clocks are associated with said plurality of nodes, the sequences of instructions including instructions for performing the steps of:

prior to said failure, said first node maintaining a first logical clock of said plurality of logical clocks to assign time values to changes made to said database by said first node;

after said failure, reading a most recent log timestamp value from a log file associated with said first node;

determining, based on said most recent log timestamp value, a recovery timestamp value that is at least as recent as any time value recorded in said database by said first node prior to said failure; and recovering said first node using said recovery timestamp value.

13. The computer-readable medium of claim 12 wherein the sequence of instructions for determining said recovery timestamp value includes instructions for:

reading a crash delta value, wherein said crash delta value equals a predetermined value;

calculating a second timestamp value, wherein said second timestamp value equals the sum of said most recent log timestamp value and said crash delta value; and determining said recovery timestamp value based on said second timestamp value.

14. The computer-readable medium of claim 12 wherein the sequence of instructions further comprises instructions for performing the following steps prior to the failure of said first node:

detecting an attempt by the first node to perform an update to said database without storing data in said log file to reflect said update;

in response to said attempt, performing the steps of
determining whether the logical clock of said first node is less than the sum of the most recent log timestamp value that is recorded in said log file and a crash delta value;

if the logical clock of said first node is not less than the sum of the most recent log timestamp value that is recorded in said log file and said crash delta value, then prohibiting said update to said database by said first node.

15. The computer-readable medium of claim 12 further comprising sequence of instructions for performing the steps of:

applying to said database one or more updates that are recorded in said log file associated with said first node; and assigning to said one or more updates timestamp values that reflect a time that is at least as recent as said recovery timestamp value.

16. The computer-readable medium of claim 12 wherein:
said database includes a body of data whose updates are not recorded in said log file; and the sequences of instructions further comprise instructions for, prior to failure of said first node, causing each of said plurality of nodes to perform the following steps when updating said body of data: reading a timestamp value from said body of data;

comparing said timestamp value with a logical clock value of said node that is updating said body of data;

if said timestamp value is more recent than said logical clock value of said node that is updating said body of data, then setting said logical clock of said node that is updating said body of data equal to said timestamp value; and writing said logical clock value of said node that is updating said body of data into said body of data.

17. The computer-readable medium of claim 12 wherein the sequence of instructions for determining said recovery timestamp value further includes instructions for:

reading a third timestamp value from a body of data, wherein updates to said body of data are not recorded in said log file; and determining said recovery timestamp value based on said third timestamp value.

18. The computer-readable medium of claim 12 wherein the sequence of instructions for determining said recovery timestamp value includes instructions for:

reading a crash delta value, wherein said crash delta value equals a predetermined value;

calculating a second timestamp value, wherein said second timestamp value equals the sum of said most recent log timestamp value and said crash delta value;

reading a third timestamp value from a body of data, wherein updates to said body of data are not recorded in said log file;

comparing said second timestamp value with said third timestamp value;

if said second timestamp value is more recent than said third timestamp value, then setting said recovery timestamp value equal to said second timestamp value; and if said third timestamp value is more recent than said second timestamp value, then setting said recovery timestamp value equal to said third timestamp value.

19. The computer-readable medium of claim 12 wherein the sequence of instructions for determining said recovery timestamp value further comprises instructions for:

reading a logical clock value from a second node, wherein said second node is one of said plurality of nodes and wherein said second node is responsible for recovering said first node;

comparing said recovery timestamp value with the logical clock value of said second node; and if the logical clock value of said second node is more recent than said recovery timestamp value, then setting said recovery timestamp value equal to the logical clock value of said second node.

20. A computer system for determining a safe recovery time value after a failure of a first node in a computer system, wherein said first node is one of a plurality of nodes that has access to a database, wherein a plurality of logical clocks are associated with said plurality of nodes, the computer system comprising:

a memory;

one or more processors coupled to the memory; and a set of computer instructions contained in the memory, the set of computer instructions including computer instructions which when executed by the one or more processors, cause the one or more processors to perform the steps of:

prior to said failure, said first node maintaining a first logical clock of said plurality of logical clocks to assign time values to changes made to said database by said first node;

after said failure, reading a most recent log timestamp value from a log file associated with said first node;

determining, based on said most recent log timestamp value, a recovery timestamp value that is at least as recent as any time value recorded in said database by said first node prior to said failure; and recovering said first node using said recovery timestamp value.

21. The computer system of claim 20 wherein the step of determining said recovery timestamp value includes the steps of:

reading a crash delta value, wherein said crash delta value equals a predetermined value;

calculating a second timestamp value, wherein said second timestamp value equals the sum of said most recent log timestamp value and said crash delta value; and determining said recovery timestamp value based on said second timestamp value.

22. The computer system of claim 20 further comprises computer instructions for performing the following steps prior to the failure of said first node:

detecting an attempt by the first node to perform an update to said database without storing data in said log file to reflect said update;

in response to said attempt, performing the steps of determining whether the logical clock of said first node is less than the sum of the most recent log timestamp value that is recorded in said log file and a crash delta value;

if the logical clock of said first node is not less than the sum of the most recent log timestamp value that is recorded in said log file and said crash delta value, then prohibiting said update to said database by said first node.

23. The computer system of claim 22 wherein the step of prohibiting said update to said database includes the steps of:

waiting until the sum of the most recent log timestamp value that is recorded in said log file and said crash delta value is greater than said logical clock of said first node; and after the sum of the most recent log timestamp value that is recorded in said log file and said crash delta value is greater than said logical clock of said first node, allowing the first node to perform said update to said database without storing data in said log file to reflect said update.

24. The computer system of claim 22 wherein the step of prohibiting said update to said database includes the steps of:

allowing said first node to perform said update to said database; and causing said first node to store data in said log file to reflect said update.

25. The computer system of claim 20 further comprising computer instructions for performing the steps of:

applying to said database one or more updates that are recorded in said log file associated with said first node; and assigning to said one or more updates timestamp values that reflect a time that is at least as recent as said recovery timestamp value.

26. The computer system of claim 20 wherein:

said database includes a body of data whose updates are not recorded in said log file; and the computer system further comprising computer instructions for performing the step of, prior to failure of said first node, causing each of said plurality of nodes to perform the following steps when updating said body of data:

reading a timestamp value from said body of data;

comparing said timestamp value with a logical clock value of said node that is updating said body of data;

if said timestamp value is more recent than said logical clock value of said node that is updating said body of data, then setting said logical clock of said node that is updating said body of data equal to said timestamp value; and writing said logical clock value of said node that is updating said body of data into said body of data.

27. The computer system of claim 20 wherein the step of determining said recovery timestamp value further comprises computer instructions for performing the steps of:

reading a third timestamp value from a body of data, wherein updates to said body of data are not recorded in said log file; and determining said recovery timestamp value based on said third timestamp value.

28. The computer system of claim 27 wherein the step of reading said third timestamp value from said body of data further comprises computer instructions for performing the step of reading said third timestamp value from a catalog file, wherein said catalog file maintains data that reflects a physical structure of said database.

29. The computer system of claim 20 wherein the step of determining said recovery timestamp value includes the steps of:

reading a crash delta value, wherein said crash delta value equals a predetermined value;

calculating a second timestamp value, wherein said second timestamp value equals the sum of said most recent log timestamp value and said crash delta value;

reading a third timestamp value from a body of data, wherein updates to said body of data are not recorded in said log file;

comparing said second timestamp value with said third timestamp value;

if said second timestamp value is more recent than said third timestamp value, then setting said recovery timestamp value equal to said second timestamp value; and if said third timestamp value is more recent than said second timestamp value, then setting said recovery timestamp value equal to said third timestamp value.

30. The computer system of claim 20 wherein the step of determining said recovery timestamp value further comprises computer instructions for performing the steps of:

reading a logical clock value from a second node, wherein said second node is one of said plurality of nodes and wherein said second node is responsible for recovering said first node;

comparing said recovery timestamp value with the logical clock value of said second node; and if the logical clock value of said second node is more recent than said recovery timestamp value, then setting said recovery timestamp value equal to the logical clock value of said second node.

31. A method for determining a safe recovery time value after a failure of a first node in a computer system, wherein said first node is one of a plurality of nodes that has access to a database, wherein a plurality of logical clocks are associated with said plurality of nodes, the method comprising the steps of:

prior to said failure, said first node maintaining a first logical clock of said plurality of logical clocks to assign time values to changes made to said database by said first node;

after said failure, reading a first possibly most recent timestamp value associated with said first node;

reading a second possibly most recent timestamp value associated with said first node;

determining, based on said first possibly most recent timestamp value and said second possibly most recent timestamp value, a recovery timestamp value that is at least as recent as any time value recorded in said database by said first node prior to said failure; and recovering said first node using said recovery timestamp value.

32. A computer-readable medium having stored thereon sequences of instructions for determining a safe recovery time value after a failure of a first node in a computer system, wherein said first node is one of a plurality of nodes that has access to a database, wherein a plurality of logical clocks are associated with said plurality of nodes, the sequences of instructions including instructions for performing the steps of:

prior to said failure, said first node maintaining a first logical clock of said plurality of logical clocks to assign time values to changes made to said database by said first node;

after said failure, reading a first possibly most recent timestamp value associated with said first node;

reading a second possibly most recent timestamp value associated with said first node;

determining, based on said first possibly most recent timestamp value and said second possibly most recent timestamp value, a recovery timestamp value that is at least as recent as any time value recorded in said database by said first node prior to said failure; and recovering said first node using said recovery timestamp value.

33. The method of claim 31 wherein:

the step of reading a first possibly most recent timestamp value comprises the steps of reading a most recent log timestamp value from a log file associated with said first node; and the step of determining a recovery timestamp value comprises the steps of determining, based on said most recent log timestamp value and said second possibly most recent timestamp value, a recovery timestamp value that is at least as recent as any time value recorded in said database by said first node prior to said failure.

34. The method of claim 33 further comprising the steps of:

reading a crash delta value, wherein said crash delta value equals a predetermined value;

calculating a timestamp value, wherein said crash delta timestamp value equals the sum of said most recent log timestamp value and said crash delta value; and determining, based on said crash delta timestamp value and said second possibly most recent timestamp value, said recovery timestamp value that is at least as recent as any time value recorded in said database by said first node prior to said failure.

35. The method of claim 33 further comprises performing the following steps prior to the failure of said first node:

detecting an attempt by the first node to perform an update to said database without storing data in said log file to reflect said update;

in response to said attempt, performing the steps of determining whether the logical clock of said node is less than the sum of the most recent log timestamp value that is recorded in said log file and a crash delta value;

if the logical clock of said first node is not less than the sum of t he most recent log timestamp value that is recorded in said log file and said crash delta value, them prohibiting said update to said database by said first node.

36. The method of claim 35 wherein the step of prohibiting said update to said database includes the steps of:

waiting until the sum of the most recent log timestamp value that is recorded in said log file and said crash delta value is greater than said logical clock of said first node; and after the sum of the most recent log timestamp value that is recorded in said and said crash delta value is greater than said logical clock of said first node; allowing the first node to perform said update to said data base without storing data in said log file to reflect said update.

37. The method of claim 35 wherein the step of prohibiting said update to said database includes the steps of:

allowing said first node to perform said update to said database; and causing said first node to store data in said log file to reflect said update.

38. The method of claim 33 further comprising the steps of:

applying to said database one or more updates that are recorded in said log file associated with said first node; and assigning to said one or more updates timestamp values that reflect a time that is at least as recent as said recovery timestamp value.

39. The method of claim 33 wherein:

said database includes a body of data whose updates are not recorded in said log file; and the method further comprising the step of, prior to failure of said first node, causing each of said plurality of nodes to perform the following steps when updating said body of data;

comparing said timestamp value with a logical clock value of said node that is updating said body of data;

if said timestamp value is more recent than said logical clock value of said node that updating said body of data, then setting said logical clock of said node that is updating said body of data equal to said timestamp value; and writing said logical clock value of said node that is updating said body of data into said body of data.

40. The method of claim 33 wherein:

the step of reading a second possibly most recent timestamp value comprises the steps of reading a non-log file timestamp value from a body of data, wherein updates to said body of data are not recorded in said log file; and the step of determining a recovery timestamp value comprises the steps of determining, based on said most recent log timestamp value and said non-log file timestamp value, a recovery timestamp value that is at least as recent as any time value recorded in said database by said first node prior to said failure.

41. The method of claim 31 further comprising the steps of:
reading a third possibly most recent timestamp value associated with said first node; and
determining, based on said first possibly most recent timestamp value, said second possibly most recent timestamp value and said third possibly most recent timestamp value, said recovery timestamp value that is at least as recent as any time value recorded in said database by said first node prior to said failure.

42. The method of claim 31 wherein:
the step of reading a first possibly most recent timestamp value comprises the steps of reading a most recent log timestamp value from a log file associated with said first node;
the step of reading a second possibly most recent timestamp value comprises the steps of reading a non-log file timestamp value from a body of data, wherein updates to said body of data are not recorded in said log file;
the method further comprising the steps of
calculating a crash delta timestamp value, wherein said crash delta timestamp value equals the sum of said most recent log timestamp value and said crash delta value;
comparing said crash delta timestamp value with said non-log file timestamp value;
if said non-log file timestamp value is more recent than said crash delta timestamp value, then setting said recovery timestamp value equal to said non-log file timestamp value; and
if said non-log file timestamp value is more recent then said crash delta timestamp value, then setting said recovery timestamp value equal to said non-log file timestamp value.

43. The method of claim 31 wherein the step of determining said recovery timestamp value further comprises the steps of:
reading a logical clock value from a second node, wherein said second node is one of said plurality of nodes and wherein said second node is responsible for recovering said first node;
comparing said recovery timestamp value with the logical clock value of said second node; and
if the logical clock value of said second node is more recent than said recovery timestamp value, then setting said recovery timestamp value equal to the logical clock value of said second node.

44. The computer-readable medium of claim 32 wherein:
the step of reading a first possibly most recent timestamp value comprises the steps of
reading a most recent log timestamp value from a log file associated with said first node; and
the step of determining a recovery timestamp value comprises the steps of determining, based on said most recent log timestamp value and said second possibly most recent timestamp value, a recovery timestamp value that is at least as recent as any time value recorded in said database by said first node prior to said failure.

45. The computer-readable medium of claim 44 further comprising instructions for performing the steps of:

reading a crash delta value, wherein said crash delta value equals a predetermined value;
calculating a crash delta timestamp value, wherein said crash delta timestamp value equals the sum of said most recent log timestamp value and said crash delta value; and
determining, based on said crash delta timestamp value and said second possibly most recent timestamp value, said recovery timestamp value that is at least as recent as any time value recorded in said database by said first node prior to said failure.

46. The computer readable medium of claim 44 the sequence of instructions further comprises instructions for performing the following steps prior to the failure of said node:
detecting an attempt by the first node to perform an update to said database without storing data in said log file to reflect said update;
in response to said attempt, performing the steps of
determining whether the logic clock of said first node is less than the sum of the most recent log timestamp value that is recorded in said log file and a crash delta value;
if the logical clock of said first node is not less than the sum of the most recent log timestamp value that is recorded in said log file and said crash delta value; then prohibiting said update to said database by said first node.

47. The computer-readable medium of claim 46 wherein the step of prohibiting said update to said database includes the steps of: waiting until the sum of the most recent log timestamp value that is recorded in said log file and said crash delta value is greater than said logical clock of said first node; and
after the sum of the most recent log timestamp value that is recorded in said log file and said crash delta value is greater than said logical clock of said first node, allowing the first node to perform said update to said database without storing data in said log file to reflect said update.

48. The computer-readable medium of claim 46 wherein the step of prohibiting said update to said database includes the steps of:
allowing said first node to perform said update to said database; and causing said first node to store data in said log file to reflect said update.

49. The computer-readable medium of claim 44 further comprising instructions for performing the steps of:
applying to said database one or more updates that are recorded in said log file associated with said first node; and
assigning to said one or more updates timestamp values that reflect a time that is at least as recent as said recovery timestamp value.

50. The computer-readable medium of claim 44 wherein:
said database includes a body of data whose updates are not recorded in said log file; and
the computer-readable medium further comprising the instructions for performing the steps of, prior to failure of said first node, causing each of said plurality of nodes to perform the following steps when updating said body of data:
reading a timestamp value from said body of data;
comparing said timestamp value with a logical clock value of said node that is updating said body of data;

if said timestamp value is more recent than said logical clock value of said node that is updating said body of data, then setting said logical clock of said node that is updating said body of data equal to said timestamp value; and writing said logical clock value of said node that is updating said body of data into said body of data.

51. The computer-readable medium of claim 44 wherein:

the step of reading a second possible most recent timestamp value comprises the steps of reading a non-log file timestamp value from a body of data, wherein updates to said body of data are not recorded in said log filed; and the step of determining a recovery timestamp value comprises the steps of determining, based on said most recent log timestamp value and said non-log file timestamp value, a recovery timestamp value that is at least as recent as any time value recorded in said database by said first node prior to said failure.

52. The computer-readable medium of claim 32 further comprises instructions for performing the steps of:

reading a third possibly most recent timestamp value associated with said first node; and determining, based on said first possibly most recent timestamp value, said second possibly most recent timestamp value and said third possibly most recent timestamp value, said recovery timestamp value that is at least as recent as any time value recorded in said database by said first node prior to said failure.

53. The computer-readable medium of claim 32 wherein:

the step of reading a first possibly most recent timestamp value comprises the steps of reading a most recent log timestamp value from a log file associated with said first node;

the step of reading a second possibly most recent timestamp value comprises the steps of reading a non-log file timestamp value from a body of data, wherein updates to said body of data are not recorded in said log file; the computer-readable medium further comprising instructions for performing the steps of calculating a crash delta timestamp value, wherein said crash delta timestamp value equals the sum of said most recent log timestamp value and said crash delta value;

comparing said crash delta timestamp value with said non-log value;

if said crash delta timestamp value is more recent than said non-log file timestamp value, then setting said recovery timestamp value equal to said non-log file timestamp value.

54. The computer-readable medium of claim 32 wherein the sequence of instructions further comprises instructions for performing the steps of:

reading a logical clock value from a second, node wherein said second node is one of said plurality of nodes and wherein said second node is responsible for recovering said first node;

comparing said recovery timestamp value with the logical clock value of said second node; and if the logical clock value of said second node is more recent than said recovery timestamp value, then setting recovery timestamp value equal to the logical clock value of said second node.

* * * * *